(12) United States Patent
Yoon et al.

(10) Patent No.: US 11,679,749 B2
(45) Date of Patent: Jun. 20, 2023

(54) SYSTEM AND METHOD FOR BRAKE INSPECTION OF VEHICLE

(71) Applicants: HYUNDAI MOTOR COMPANY, Seoul (KR); KIA MOTORS CORPORATION, Seoul (KR)

(72) Inventors: Sang Won Yoon, Seoul (KR); Jeongwoo Kim, Gwangmyeong-si (KR); Hyunmin Choi, Hongseong-eup (KR); Kyung Joo Cho, Gwangmyeong-si (KR); Beomkyo Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 147 days.

(21) Appl. No.: 16/901,457

(22) Filed: Jun. 15, 2020

(65) Prior Publication Data
US 2021/0094527 A1    Apr. 1, 2021

(30) Foreign Application Priority Data
Sep. 26, 2019 (KR) .......................... 10-2019-0118691

(51) Int. Cl.
*B60T 17/22* (2006.01)
*G07C 5/08* (2006.01)
*H04W 4/44* (2018.01)

(52) U.S. Cl.
CPC .............. *B60T 17/221* (2013.01); *G07C 5/08* (2013.01); *H04W 4/44* (2018.02); *B60T 2270/30* (2013.01)

(58) Field of Classification Search
CPC .... B60T 17/221; B60T 2270/30; B60T 17/22; B60T 2270/406; G07C 5/08;
(Continued)

(56) References Cited

U.S. PATENT DOCUMENTS

| 11,110,979 B2 * | 9/2021 | Watanabe | ............ B62D 65/024 |
| 2015/0091370 A1 * | 4/2015 | Yamasaki | ............ B60T 13/662 303/11 |
| 2021/0089014 A1 * | 3/2021 | Yoshimoto | ........... G06Q 30/018 |

FOREIGN PATENT DOCUMENTS

| JP | 4175676 B2 * | 5/2008 | ................ B60T 8/88 |
| JP | 2011-156999 A * | 8/2011 | ............. Y02T 10/62 |
| KR | 2005-0023153 A * | 3/2005 | .............. B60T 11/26 |

\* cited by examiner

*Primary Examiner* — Russell Frejd
*Assistant Examiner* — Ana D Thomas
(74) *Attorney, Agent, or Firm* — McDonnell Boehnen Hulbert & Berghoff LLP

(57) ABSTRACT

A system for brake inspection of vehicle for checking a brake performance of the vehicle in which brake fluid is injected in a vehicle factory includes a communication unit connecting the vehicle entered through the conveyor and the diagnostic communication, a specification determination unit that collects specification information of the vehicle and determines whether to apply an electronic stability control (ESC) device, a specification determination unit that collects specification information of the vehicle and determines whether to apply an electronic stability control (ESC) device, and an inspector consisting of a control unit that determines that the ESC pressure value measured by the forced driving of the ESC exceeds the set reference value, and determines that the brake pressure is normal (OK), and determines that the ESC pressure is abnormal (NG).

19 Claims, 6 Drawing Sheets

(58) Field of Classification Search
CPC ...... G07C 5/008; G07C 2205/02; G07C 5/02; H04W 4/44; B60K 35/00; B60K 2370/152; G01M 17/007
See application file for complete search history.

SYSTEM AND METHOD FOR BRAKE INSPECTION OF VEHICLE

CROSS REFERENCE TO RELATED APPLICATIONS

This application claims priority to and the benefit of Korean Patent Application No. 10-2019-0118691 filed in the Korean Intellectual Property Office on Sep. 26, 2019, the entire contents of which are incorporated herein by reference.

BACKGROUND

(a) Field

The present disclosure relates to a system and method for brake inspection of vehicle. More particularly, the present disclosure relates to a system and method for brake inspection of vehicle for checking the braking performance of a brake after injecting brake fluid into the vehicle in a vehicle factory.

(b) Description of the Related Art

In general, a vehicle factory checks whether brake fluid is properly delivered to a caliper by injecting brake fluid into an assembled vehicle and then operating the brake pedal.

When the brake fluid is injected into the vehicle, it is delivered in the order of the reservoir tank, master cylinder, HCU and caliper. However, since the pipe to be transmitted is long, narrow, and has high resistance, intermittent transmission to the end of the caliper causes a brake pushing phenomenon.

Therefore, the operator starts the vehicle if there is no abnormality after confirming the effort by operating the brake pedal before and after starting the vehicle in case the injected brake fluid does not reach the end of the caliper (see prior art in FIG. 6).

However, in the conventional brake inspection, although the operator checks the pedal effort by repeatedly pressing the pedal repeatedly, there is a problem in that a safety accident occurs due to the brake pushing of the vehicle because it relies only on the brake feeling of the operator.

That is, a conventional brake inspection method that relies on a worker may require a more improved brake inspection method for safety since costs such as personnel accidents due to human errors of workers, damage to production facilities, and line stops may occur.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a system and method for brake inspection of vehicle for checking the braking performance of a brake by measuring the brake pressure through the driving of a vehicle electronic stability control (ESC) device before starting a vehicle in which a brake fluid is injected in a vehicle factory.

According to an exemplary embodiment of the present disclosure, a system for brake inspection of vehicle for checking a brake performance of the vehicle in which brake fluid is injected in a vehicle factory includes a communication unit connecting the vehicle entered through the conveyor and the diagnostic communication, a specification determination unit that collects specification information of the vehicle and determines whether to apply an electronic stability control (ESC) device, a specification determination unit that collects specification information of the vehicle and determines whether to apply an electronic stability control (ESC) device, and an inspector consisting of a control unit that determines that the ESC pressure value measured by the forced driving of the ESC exceeds the set reference value, and determines that the brake pressure is normal (OK), and determines that the ESC pressure is abnormal (NG).

The system for brake inspection of vehicle may further include a scanner that transmits a vehicle identification number (VIN) recognized by the barcode attached to the vehicle to the inspector, and an antenna that relays data transmitted and received between the inspector and the vehicle by connecting wireless diagnostic communication with the OBD mounted on the vehicle.

Further, the communication unit may recognize the entry of the vehicle with the VIN received from the scanner.

Further, the communication unit may recognize the OBD ID by querying vehicle information to a production management system (MES) with the VIN, and connects the wireless diagnostic communication by authenticating the OBD ID of the OBD requested to access the antenna.

Further, the specification determination unit may search the specification information matching the VIN in the production management system (MES) to determine whether the ESC is applied.

Further, the inspector may be provided as a portable carrying by the operator, and the communication unit may connect the OBD mounted on the vehicle with wired or wireless diagnostic communication.

Further, the specification determination unit may collect specification information from the vehicle through diagnostic communication with the OBD to determine whether the ESC is applied.

Further, the inspector may further include a storage unit that stores a determination result according to the inspection of the vehicle brake, and a display unit that displays the determination result to an operator.

Further, the control unit may read the ESC pressure value measured according to the occurrence of braking hydraulic pressure of the ESC in the vehicle, and compare the ESC pressure value with a set reference value corresponding to the magnitude of the braking hydraulic pressure of the ESC to determine whether the brake pressure is normal.

Further, the control unit may repeatedly generate a maximum brake braking hydraulic pressure of the ESC specification a predetermined number of times through the ESC driver when it is determined that the brake pressure is abnormal.

Further, the control unit may determine that the brake fluid piping is defective and bypasses the vehicle in a repair process if the ESC pressure value after the brake braking hydraulic pressure is repeatedly generated a predetermined number of times is less than the set reference value, and the ESC pressure value read repeatedly is not increased.

Meanwhile, according to an exemplary embodiment of the present disclosure, a method for brake inspection of vehicle for checking a brake performance of the vehicle in which brake fluid is injected in a vehicle factory includes a) recognizing the vehicle entered through the conveyor to connect the diagnostic communication, b) determining whether to apply the vehicle attitude control device (ESC)

by collecting specification information of the vehicle, c) generating a braking hydraulic pressure according to the forced driving of the ESC by transmitting a control signal through the diagnostic communication when the ESC is applied to the vehicle, and d) determining a brake pressure as normal (OK) if the ESC pressure value read according to the forced driving of the ESC exceeds a set reference value, and determining as abnormal (NG) when the set reference value is not exceeded.

Further, step a) may include recognizing the entry of the vehicle and querying the OBD ID of the OBD mounted on the vehicle with the VIN when the vehicle identification number (VIN) recognized by the scanner is received, and connecting the wireless diagnostic communication with the OBD by authenticating the OBD ID requested to access the antenna.

Further, step a) may include operating the vehicle in an IG ON mode by transmitting a power-on signal through the diagnostic communication.

Further, step b) may include requesting specification information of the vehicle through the diagnostic communication and checking specification information collected from the vehicle.

Further, the specification information may be collected through inquiry of vehicle information matching the VIN in the production management system (MES).

Further, step d) may include comparing the ESC pressure value collected from the vehicle with a set reference value corresponding to the brake hydraulic pressure level of the ESC to determine whether the brake pressure is normal and displaying it to an operator.

Further, step d) may include transmitting a control signal to the vehicle to control to generate a repeated number of braking hydraulic pressures if it is determined that the brake pressure of the vehicle is abnormal.

Further, after transmitting a control signal to the vehicle to control to generate a repeated number of braking hydraulic pressures, the method for brake inspection of vehicle may further include determining that the brake fluid piping is defective if the ESC pressure value is less than the set reference value and the ESC pressure value read repeatedly is not increased.

According to an exemplary embodiment of the present disclosure, by improving the inspection method depending on the operator's brake feeling, it is effective to prevent the occurrence of risk and cost of brake safety accidents due to existing human errors by determining whether the brake pressure is normal due to the forced driving of the vehicle.

Further, it is possible to improve the inspection reliability at no additional cost by automatically checking the braking performance after the injection of brake fluid through an inspection algorithm that forcibly drives the ESC mounted on the vehicle without additional equipment in the vehicle factory.

Further, by using mechanical braking using ESC, it is possible to shorten the inspection process time per vehicle by applying a faster and larger braking hydraulic pressure than a human. Furthermore, it is possible to expect an effect capable of further detecting defects in the brake fluid piping and bypassing the repair process.

DETAILED DESCRIPTION

Figure 1:
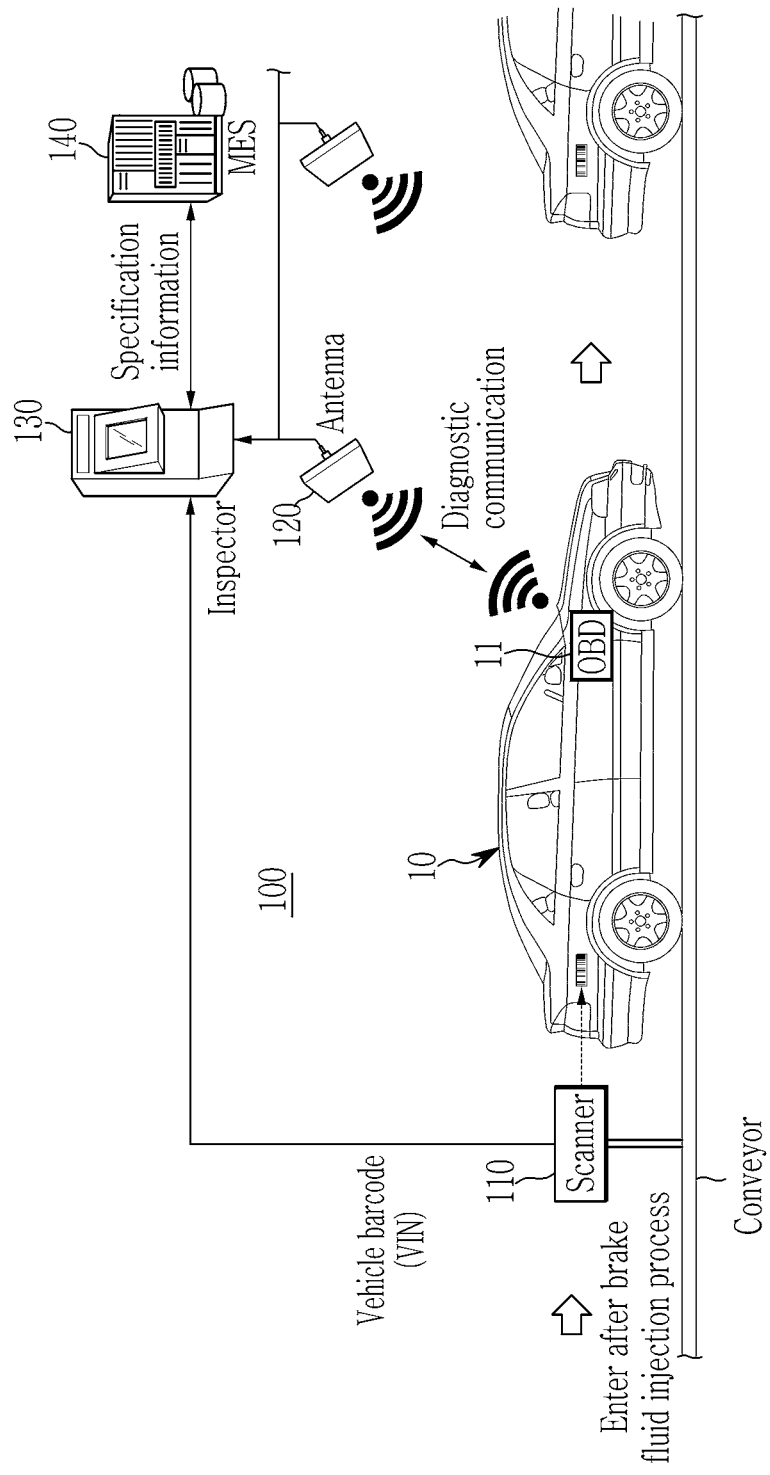
FIG. 1 schematically shows a configuration of a system for brake inspection according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

It will be understood that when an element is referred to as being "connected," or "coupled," to another element throughout the specification, it can be directly connected or coupled to the other element or intervening elements may be present. In contrast, when an element is referred to as being "directly connected," or "directly coupled," to another element, there are no intervening elements present.

A system and method for brake inspection of vehicle according to an exemplary embodiment of the present disclosure will now be described in detail with reference to the drawings.

FIG. 1 schematically shows a configuration of a system for brake inspection according to an exemplary embodiment of the present disclosure.

Referring to FIG. 1, a system for brake inspection according to an exemplary embodiment of the present disclosure includes a scanner 110 installed on a production line of a vehicle factory, an antenna 120, an inspector 130, and a manufacturing execution system (MES) 140.

The system 100 for brake inspection for vehicle connects diagnostic communication with the vehicle 10 entered through a conveyor through a brake fluid injection process, and through forced driving of an electronic stability control (ESC) device mounted on the vehicle. Brake pressure is checked to automatically check braking performance.

The vehicle 10 is assembled while going through several production lines along a conveyor with OBD (On-Board Diagnostics, 11) mounted. Then, after passing through the brake fluid injection process, the brake enters a braking performance inspection process.

Figure 2:
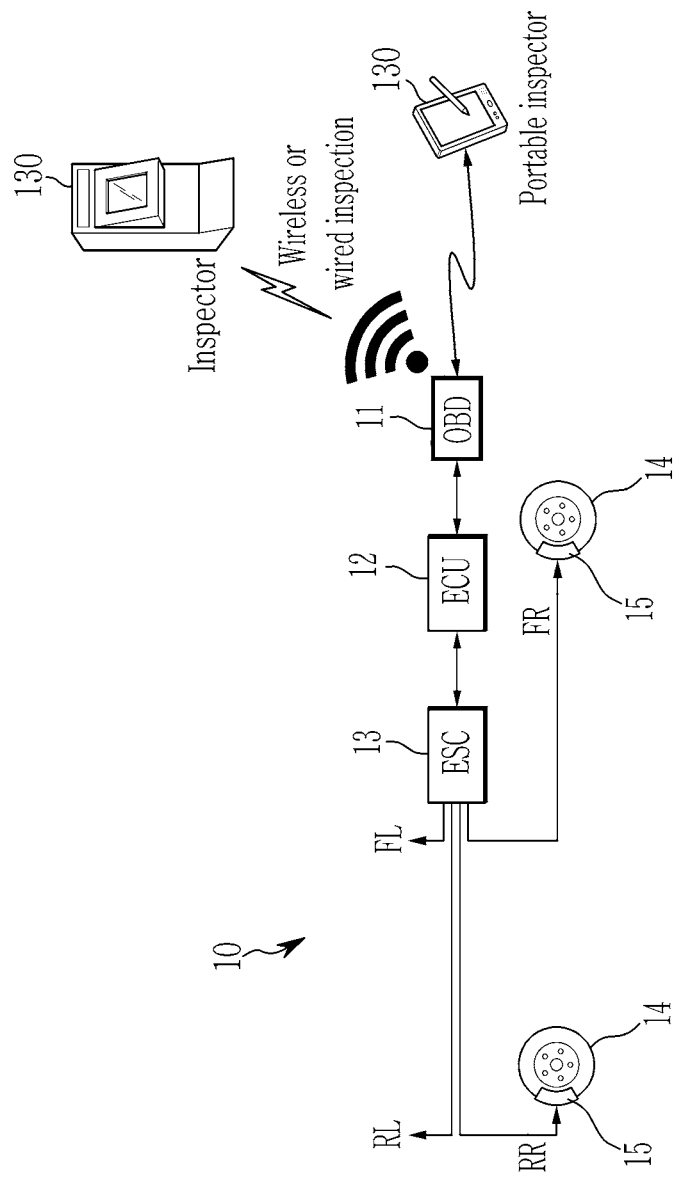
FIG. 2 schematically shows a configuration of a vehicle electronic stability control device inside a vehicle according to an exemplary embodiment of the present disclosure.

FIG. 2 schematically shows a configuration of a vehicle electronic stability control device inside a vehicle according to an exemplary embodiment of the present disclosure.

The vehicle 10 includes a brake disc 14 and a caliper 15 provided in the OBD 11, the ECU (Electronic Control Unit 12), the ESC 13, and the four wheels front right (FR), front left (FL), rear right (RR), and rear left (RL), respectively.

The OBD 11 is a diagnostic communication device that supports wireless or wired inspection of the vehicle 10.

The OBD 11 connects the external inspector 130 and the wireless or wired diagnostic communication by using the unique identification information (OBD ID), and the ECU 12 and the ESC 13 through the vehicle internal network (e.g., CAN). Hereinafter, in the exemplary embodiment of the present disclosure, unless otherwise specified, the inspector 130 will be described as a wireless diagnostic communication method inspector 130. However, the exemplary embodiment is not limited thereto, and may be connected to the portable inspector 130 of the operator through a wired diagnostic communication method.

The OBD 11 enters the IG ON mode of the vehicle 10 according to the received power ON signal when the inspector 130 and the diagnostic communication are connected, so that power is supplied to various electronic devices.

The ECU 12 is an upper level control unit that controls various electronic devices applied to the vehicle's brake system, and controls lower electronic devices such as an anti-lock brake system (ABS), a transaction control system (TSC), and an ESC 13.

The ECU 12 may transmit the brake system specification including the ESC 13 to the inspector 130 when the diagnostic communication through the OBD 11 is connected.

In addition, the ECU 12 may drive the ESC 13 according to a control signal received for checking the brake from the inspector 130.

Meanwhile, in the brake system of a vehicle, devices that increase driving stability by combining mechanical, electronic equipment, and software are being added while driving and safety are important factors for vehicle quality.

For example, the ESC 13 is also called an electronic stability program (ESP), and is a vehicle stability control device in which the function of independently controlling the braking force of each wheel is added to ABS for braking safety and TCS for safety during acceleration/rotation.

The ESC 13 independently brakes each wheel when an unsafe situation occurs in a vehicle through various sensors such as a wheel speed sensor, a steering angle sensor, a yaw rate, and a lateral acceleration sensor. And, it is possible to secure the steering stability of the vehicle by controlling the output of the engine.

The ESC 13 is forcibly driven according to a control signal applied from the ECU 12 when the braking performance is verified through a diagnostic communication connection with the inspector 130 to generate braking hydraulic pressure on the four wheels of the vehicle. Then, the brake pressure (hereinafter referred to as ESC pressure) applied to the actual pipe is measured according to the braking hydraulic pressure.

Here, the braking hydraulic pressure may correspond to the force of the operator pressing the brake pedal, and the ESC pressure may correspond to the brake pressure transmitted to the actual caliper 15 compared to the pressing force. In addition, when the brake oil is not delivered to the end of the caliper 15, the ESC pressure becomes weaker than the set value and the brake pressure (ESC pressure) increases as the end of the caliper 15 approaches.

Figure 3:
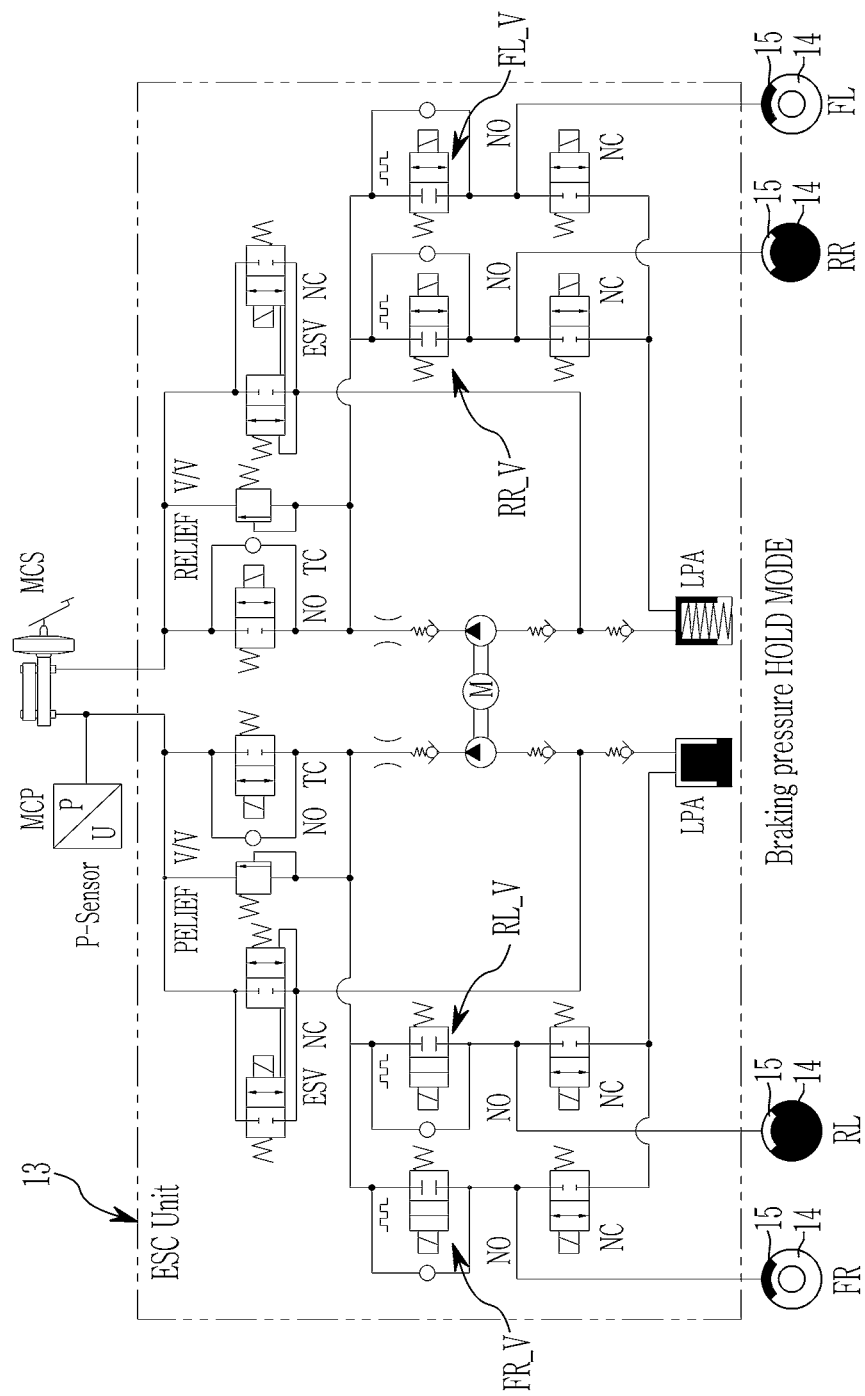
FIG. 3 shows the configuration of the ESC according to an exemplary embodiment of the present disclosure.

FIG. 3 shows the configuration of the ESC according to an exemplary embodiment of the present disclosure.

Referring to FIG. 3, the ESC (13) according to an exemplary embodiment of the present disclosure includes a motor pump (M) that generates braking hydraulic pressure, an FL valve (FL_V) that regulates the braking hydraulic pressure of the front left wheel (FL) of the vehicle, and a front right wheel (FR). FR valve (FR_V) for adjusting the braking hydraulic pressure, RL valve (RL_V) for regulating the braking hydraulic pressure of the rear left wheel (RL), and RR valve (RR_V) for regulating the braking hydraulic pressure of the rear right wheel (RR).

The ESC 13 operates the motor pump M according to the applied control signal to generate the braking hydraulic pressure. In addition, a large brake pressure of about 100 to 200 bar can be transmitted to the caliper 15 of each wheel through adjustment of each valve V that controls the strength of the braking hydraulic pressure. The mechanical brake pressure is significantly larger and faster than the pressure of the person applying the brake, so the time required for inspection per vehicle can be reduced.

Referring again to FIG. 1, the scanner 110 transmits the vehicle identification number VIN recognized from the barcode attached to the vehicle 10 entering the process line to the inspector 130. Here, the scanner 110 will be described on the assumption of a barcode scanner, but is not limited thereto, and may be configured as a reader that recognizes a radio frequency identification (RFID) or tag containing identification information of the vehicle 10 when a tag is attached.

The antenna 120 connects the OBD 11 of the vehicle 10 with wireless diagnostic communication to relay data transmitted and received between the inspector 130 and the vehicle 10. The antenna 120 may be configured as a directional antenna for short-range communication, and may be arranged in a plurality at regular intervals along a conveyor on which the vehicle 10 is moved.

The inspector 130 recognizes the entry of the vehicle 10 by receiving the vehicle identification number (VIN), and connects diagnostic communication with the vehicle 10 through the antenna 120 to mount the electronic stability control (ESC) device mounted on the vehicle automatically checks the braking performance of the brake through forced driving.

Figure 4:
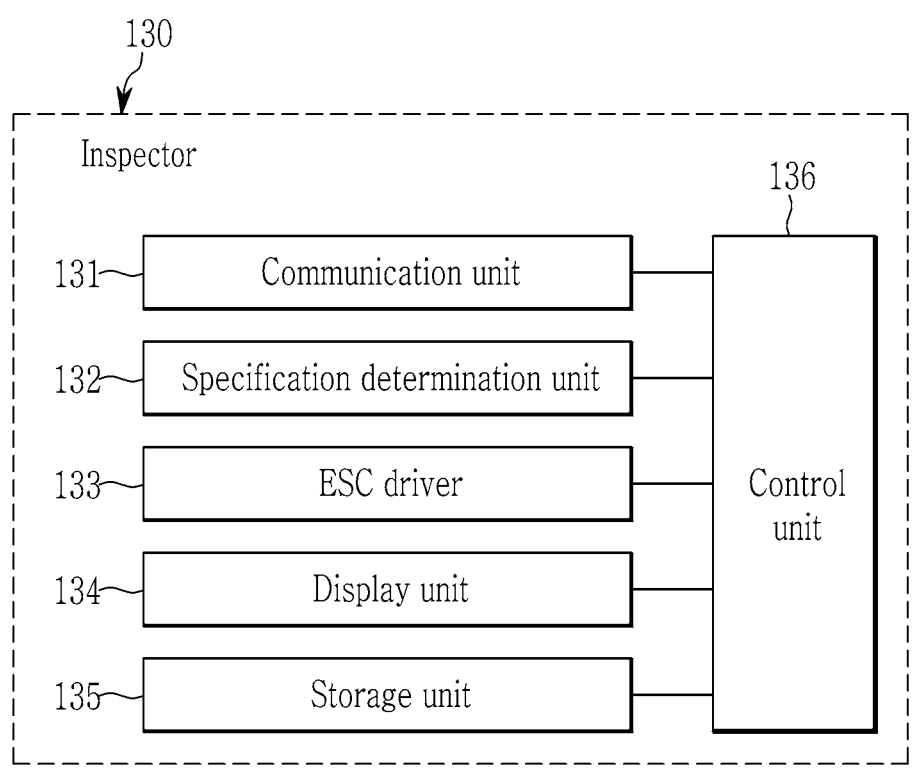
FIG. 4 is a block diagram schematically showing the configuration of an inspector according to an exemplary embodiment of the present disclosure.

FIG. 4 is a block diagram schematically showing the configuration of an inspector according to an exemplary embodiment of the present disclosure.

Referring to FIG. 4, the inspector 130 according to an exemplary embodiment of the present disclosure includes a communication unit 131, a specification determination unit 132, an ESC driver 133, a display unit 134, a storage unit 135, and a control unit 136.

The communication unit 131 includes wired/wireless communication means, and recognizes the entry of the vehicle 10 with the VIN received from the scanner 110.

The communication unit 131 recognizes the OBD ID by inquiring vehicle information to the MES 140 using the VIN. In addition, the vehicle diagnostic communication through the OBD 11 may be connected by authenticating the OBD ID of the OBD 11 requested to access the antenna 120.

The specification determination unit 132 may collect the specification information of the vehicle 10 through diagnostic communication with the OBD 11 and determine whether the ESC 13 is applied to the vehicle 10.

However, the present disclosure is not limited thereto, and the specification determination unit 132 may query the MES 140 for specification information matching the VIN to determine whether the ESC 13 is applied to the vehicle 10.

The ESC driver 133 transmits a control signal to the vehicle 10 through diagnostic communication to generate brake hydraulic pressure of the brake according to the forced driving of the ESC 13. At this time, the ESC driver 133 may repeatedly generate the brake hydraulic pressure of the brake corresponding to the maximum value of the ESC 13 specification a predetermined number of times.

The display unit 134 displays information generated according to the operation of the inspector 130, and, for example, may display a determination result according to the brake inspection of the vehicle 10 to the operator.

The storage unit 135 stores various programs and data for the operation of the inspector 130, and stores test result data generated according to the operation.

The storage unit 135 may store the determination result according to the brake inspection of the vehicle 10 and update the MES 140 to share.

The control unit 136 controls the operation of the respective parts of the inspector 130 according to an exemplary embodiment of the present disclosure. Then, the brake operation of the vehicle 10 in which the brake fluid is injected in the previous process is controlled through diagnostic communication to check the braking performance according to whether the brake pressure is normal.

Conventionally, there is no way to drive the brake and drive the ESC 13 before starting and driving the vehicle, and the only method to force the operator to repeatedly press the pedal is to check the brake operation state.

Accordingly, the control unit 136 connects diagnostic communication with the vehicle 10 before starting, and generates a large braking hydraulic pressure of about 100 bar to 200 bar according to the specification to the caliper 15 of each wheel according to the forced drive control signal of the ESC 13. Then, the control unit 136 measures the ESC pressure according to the occurrence of the braking hydraulic pressure and compares it with a set reference value corresponding to the braking hydraulic pressure of the ESC 13 to determine whether the brake pressure is normal (OK/NG) without operator intervention.

The inspector 130 may be implemented by including one or more processors operated by a program including a series of instructions for performing the functions of each part, and the set program may be programmed to perform each step of the vehicle brake inspection method according to an embodiment of the present disclosure described below.

On the other hand, the brake inspection method of such a vehicle will be described in more detail with reference to the drawings below, but the configuration of each part can be integrated into one inspector 130, and the main body thereof will be described as the inspector 130.

Figure 5:
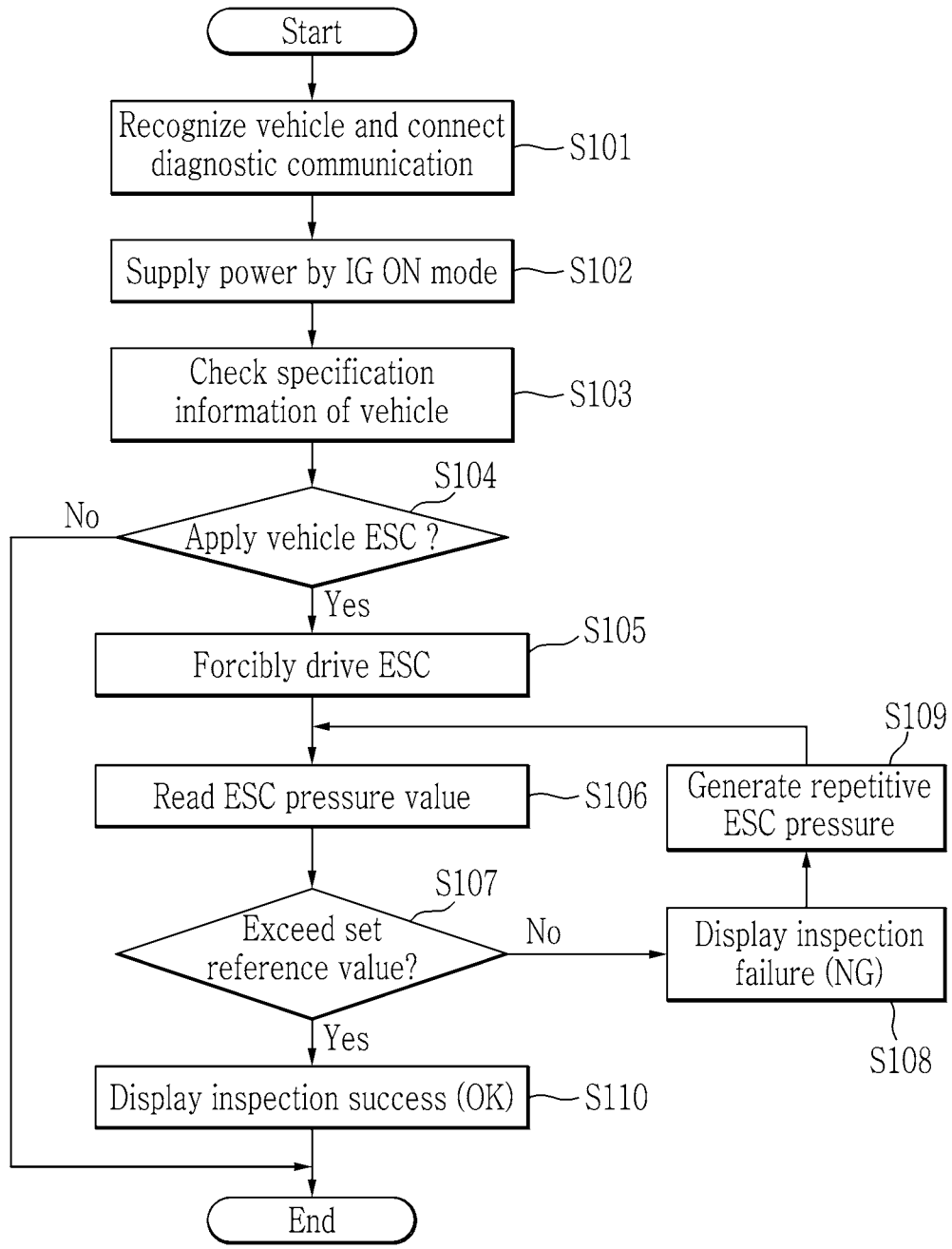
FIG. 5 is a flowchart schematically illustrating a method for brake inspection of a vehicle according to an exemplary embodiment of the present disclosure.

FIG. 5 is a flowchart schematically illustrating a method for brake inspection of a vehicle according to an exemplary embodiment of the present disclosure.

Referring to FIG. 5, an inspector 130 according to an exemplary embodiment of the present disclosure is installed in a brake inspection line of a vehicle factory and shows a flow for inspecting a brake braking pressure of a transported vehicle after injection of brake fluid.

When the VIN is received from the scanner 110, the inspector 130 recognizes the entry of the vehicle 10 and connects the diagnostic communication by querying the OBD ID of the OBD 11 mounted on the vehicle 10 with the VIN at S101. At this time, the inspector 130 may authenticate the OBD ID requested to access the antenna 120 to connect wireless diagnostic communication with the OBD 11.

The inspector 130 operates the vehicle 10 in the IG ON mode by transmitting a power ON signal through the diagnostic communication at S102. At this time, the vehicle 10 is supplied with power in a non-start state upon entering the IG ON mode.

The inspector 130 requests specification information of the vehicle 10 through the diagnostic communication and checks specification information received from the vehicle 10 at S103. Here, the specification information can also be obtained from the MES 140 through inquiry of vehicle information matching the VIN.

At this time, the inspector 130 determines that the ESC 13 is not applied to the vehicle if the ESC 13 does not exist in the specification information (S104; No), ends the automatic inspection and checks the brake pressure state by the existing operator.

On the other hand, if the ESC 13 is present in the specification information, the inspector 130 determines that the ESC 13 is applied to the vehicle (S104; Yes). Then, the control signal is transmitted to the vehicle 10 so that the ESC 13 is forcibly driven at S105. At this time, the ESC 13 of the vehicle 10 is forcibly driven according to a control signal applied from the inspector 130 to generate braking hydraulic pressure on the four wheels of the vehicle.

The inspector 130 reads the ESC pressure value according to the generation of the braking hydraulic pressure of the ESC 13 from the vehicle 10 at S106. Then, the ESC pressure value is compared with a set reference value corresponding to the size of the braking hydraulic pressure of the ESC 13 to determine whether the brake pressure is normal (OK/NG) at S107. For example, the set reference value may be set to 80 bar corresponding to 80% of the ESC 13, assuming that the maximum braking hydraulic pressure is 100 bar. However, the setting reference value is not limited to this, and may be set through a predetermined algorithm (e.g., a program and a probability model).

In step S107, when the ESC pressure value exceeds the set reference value (S107; Yes), the inspector 130 determines that the brake pressure is normal (OK) and displays it to the operator at S110.

On the other hand, in step S107, if the ESC pressure value does not exceed the set reference value (S107; No), the inspector 130 determines that the brake pressure is abnormal (NG) and displays it to the operator at S108. Here, if the ESC pressure value does not exceed the set reference value, it means that the brake fluid injected into the vehicle 10 is not properly transmitted to the end of the caliper.

Accordingly, the inspector 130 transmits a control signal to the vehicle 10 to control the repetitive braking hydraulic pressure to be generated a predetermined number of times at S109.

Subsequently, the inspector 130 returns to the step S106 to read the ESC pressure value according to the repeated braking hydraulic pressure generation of the ESC 13 from the vehicle 10 (S106), and repeats the comparison with the set reference value. At this time, when the ESC 13 generates repetitive braking hydraulic pressure, it is normal that the reading ESC pressure value gradually increases since the brake fluid in the pipe is gradually transferred to the end of the caliper.

Therefore, when the brake fluid is gradually transferred to the end of the caliper and the ESC pressure value exceeds the set reference value (S107; Yes), the inspector 130 determines that the brake pressure is normal (OK) at S110.

However, although it is omitted in the drawings, the inspector 130 does not increase the ESC pressure value less than the set reference value (S107; No), and the ESC pressure value that is repeatedly read is not normally increased even after repeated braking hydraulic pressure is generated more than a predetermined number of times. It is possible to determine that the brake fluid piping is defective and to bypass the vehicle 10 by a repair process.

Figures 6A, 6B:
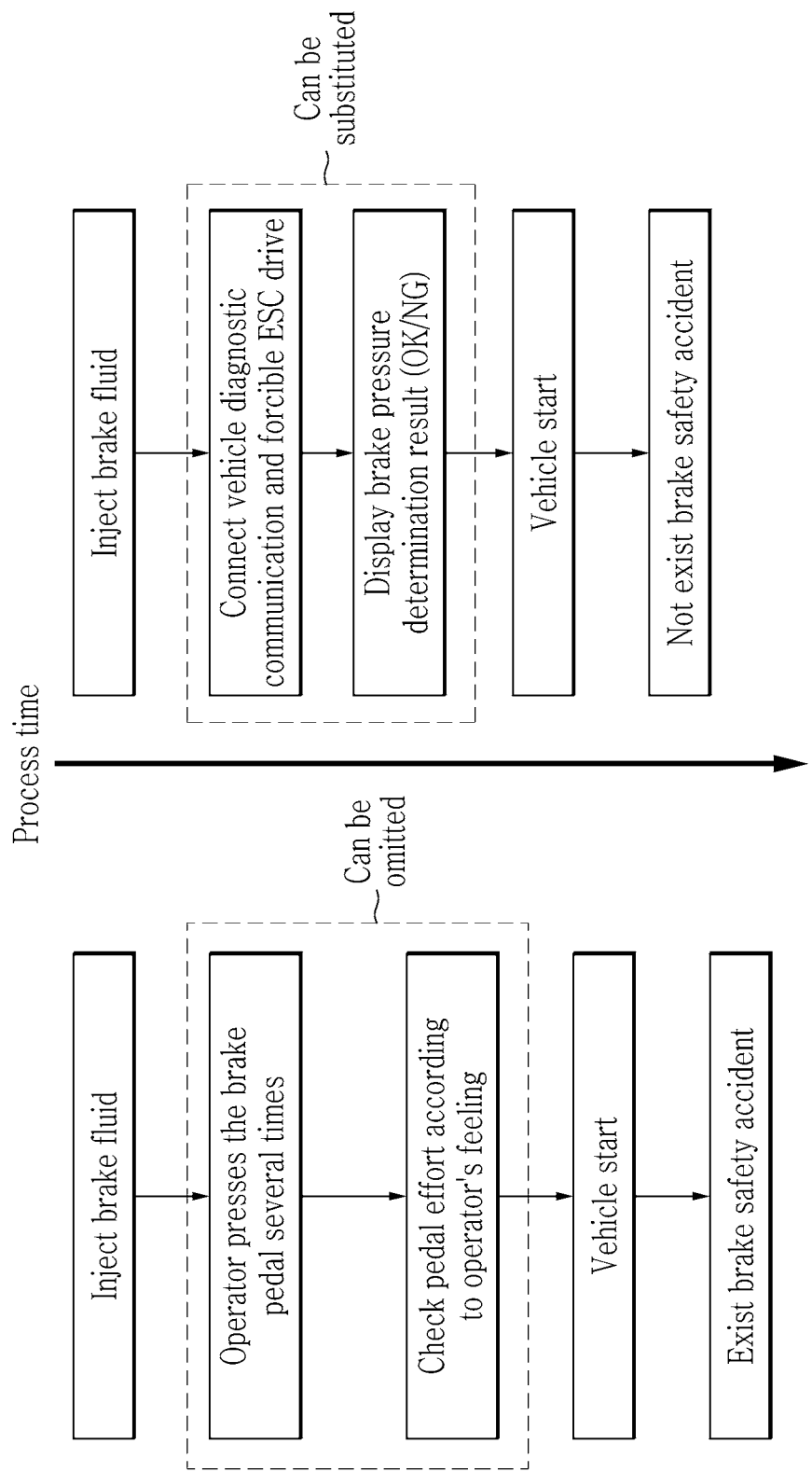
FIGS. 6A and 6B show a comparison of the method for brake inspection after injecting the brake fluid according to the conventional and exemplary embodiments of the present disclosure.

FIGS. 6A and 6B show a comparison of the method for brake inspection after injecting the brake fluid according to the conventional and exemplary embodiments of the present disclosure.

Referring to FIG. 6A, in the conventional method of inspecting the braking performance of the brake after injecting the brake fluid, there is a risk of a brake safety accident in such a way that the operator presses the brake pedal several times and checks the pedal effort according to the operator's feeling.

On the other hand, referring to FIG. 6B, the vehicle brake inspection method according to an embodiment of the present disclosure is an improvement of the inspection method depending on the brake feeling of a conventional worker, by determining whether the brake pressure is normal due to the ESC forced driving of the vehicle, there is an effect of preventing the risk and cost of a brake safety accident due to an existing human error.

Further, it is possible to improve the inspection reliability at no additional cost by automatically checking the braking performance after the injection of brake fluid through an inspection algorithm that forcibly drives the ESC mounted on the vehicle without additional equipment in the vehicle factory.

Further, by using mechanical braking using ESC, it is possible to shorten the inspection process time per vehicle by applying a faster and larger braking hydraulic pressure than a human. Furthermore, it is possible to expect an effect capable of further detecting defects in the brake fluid piping and bypassing the repair process.

The exemplary embodiments of the present disclosure have been described above, but the present disclosure is not limited to the above-described embodiments, and various other modifications are possible.

For example, in the above-described embodiment of the present disclosure, the description has been mainly focused on the contents of the inspector 130 connecting the vehicle 10 and the wireless diagnostic communication to perform the wireless inspection. However, the exemplary embodiment of the present disclosure is not limited to this, and as shown in FIG. 2, the portable inspector 130 carried by the operator may be connected to the OBD 11 by wired/wireless diagnostic communication to perform a brake inspection.

The exemplary embodiment of the present disclosure is not implemented only by the apparatus and/or method described above, but may also be implemented by a program for realizing a function corresponding to the configuration of the exemplary embodiment of the present disclosure, and recording media on which the program is recorded, and the implementation may be easily made from the disclosure of the exemplary embodiment described above by experts in the technical field to which the present disclosure pertains.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A system for brake inspection of vehicle for checking a brake performance of the vehicle in which brake fluid is injected in a vehicle factory, comprising:
   a communication unit connecting the vehicle entered through a conveyor and a diagnostic communication;
   a specification determination unit that collects specification information of the vehicle and determines whether to apply an electronic stability control (ESC) device;
   an ESC driver that transmits a control signal through the diagnostic communication to the vehicle to which the ESC device is applied, to generate braking hydraulic pressure according to forced driving of the ESC device; and
   an inspector consisting of a control unit that determines that an ESC pressure value measured by forced driving of the ESC device exceeds a set reference value, and determines that a brake pressure is normal (OK), and determines that the ESC pressure is abnormal (NG);
   wherein the control unit is configured to repeatedly generate a brake braking hydraulic pressure of the ESC device a predetermined number of times through the ESC driver to deliver a brake fluid to a caliper before the control unit determine the ESC pressure value measured exceeds the set reference value.

2. The system for brake inspection of vehicle of claim 1, further comprising:
   a scanner that transmits a vehicle identification number (VIN) recognized by the barcode attached to the vehicle to the inspector; and
   an antenna that relays data transmitted and received between the inspector and the vehicle by connecting wireless diagnostic communication with the OBD mounted on the vehicle.

3. The system for brake inspection of vehicle of claim 2, wherein:
   the communication unit is configured to recognize the entry of the vehicle with the VIN received from the scanner.

4. The system for brake inspection of vehicle of claim 2, wherein:
   the communication unit is configured to recognize the OBD ID by querying vehicle information to a production management system (MES) with the VIN, and connect the wireless diagnostic communication by authenticating the OBD ID of the OBD requested to access the antenna.

5. The system for brake inspection of vehicle of claim 2, wherein:
   the specification determination unit is configured to search the specification information matching the VIN in the production management system (MES) to determine whether the ESC device is applied.

6. The system for brake inspection of vehicle of claim 1, wherein:
   the inspector is provided as a portable carrying by the operator; and
   the communication unit connects the OBD mounted on the vehicle with wired or wireless diagnostic communication.

7. The system for brake inspection of vehicle of claim 6, wherein:
   the specification determination unit is configured to collect specification information from the vehicle through diagnostic communication with the OBD to determine whether the ESC device is applied.

8. The system for brake inspection of vehicle of claim 1, wherein:
the inspector further includes:
a storage unit that stores a determination result according to the inspection of the vehicle brake; and
a display unit that displays the determination result to an operator.

9. The system for brake inspection of vehicle of claim 1, wherein:
the control unit is configured to read the ESC pressure value measured according to the occurrence of braking hydraulic pressure of the ESC device in the vehicle, and compare the ESC pressure value with a set reference value corresponding to the magnitude of the braking hydraulic pressure of the ESC device to determine whether the brake pressure is normal.

10. The system for brake inspection of vehicle of claim 1, wherein:
the control unit is configured to repeatedly generate a maximum brake braking hydraulic pressure of the ESC device a predetermined number of times through the ESC driver when it is determined that the brake pressure is abnormal.

11. The system for brake inspection of vehicle of claim 10, wherein:
the control unit is configured to determine that the brake fluid piping is defective and bypasses the vehicle in a repair process when the ESC pressure value after the brake braking hydraulic pressure is repeatedly generated a predetermined number of times is less than the set reference value, and the ESC pressure value read repeatedly is not increased.

12. A method for brake inspection of vehicle for checking a brake performance of the vehicle in which brake fluid is injected in a vehicle factory, comprising:
a) recognizing the vehicle entered through a conveyor to connect a diagnostic communication;
b) determining whether to apply the vehicle electronic stability control (ESC) device by collecting specification information of the vehicle;
c) generating a braking hydraulic pressure according to the forced driving of the ESC device by transmitting a control signal through the diagnostic communication when the ESC device is applied to the vehicle;
d) determining a brake pressure as normal (OK) when an ESC pressure value read according to forced driving of the ESC device exceeds a set reference value, and determining as abnormal (NG) when the set reference value is not exceeded; and
e) repeatedly generating a brake braking hydraulic pressure of the ESC device a predetermined number of times through the ESC driver to deliver a brake fluid to a caliper before the control unit determine the ESC pressure value measured exceeds the set reference value.

13. The method for brake inspection of vehicle of claim 12, wherein step a) further includes:
recognizing the entry of the vehicle and querying the OBD ID of the OBD mounted on the vehicle with the VIN when the vehicle identification number (VIN) recognized by the scanner is received; and
connecting the wireless diagnostic communication with the OBD by authenticating the OBD ID requested to access the antenna.

14. The method for brake inspection of vehicle of claim 12, wherein step a) further includes operating the vehicle in an IG ON mode by transmitting a power-on signal through the diagnostic communication.

15. The method for brake inspection of vehicle of claim 12, wherein step b) further includes requesting specification information of the vehicle through the diagnostic communication and checking specification information collected from the vehicle.

16. The method for brake inspection of vehicle of claim 13, wherein the specification information is collected through inquiry of vehicle information matching the VIN in the production management system (MES).

17. The method for brake inspection of vehicle of claim 12, wherein step d) further includes comparing the ESC pressure value collected from the vehicle with a set reference value corresponding to the brake hydraulic pressure level of the ESC device to determine whether the brake pressure is normal and displaying it to an operator.

18. The method for brake inspection of vehicle of claim 12, wherein step d) further includes transmitting a control signal to the vehicle to generate a repeated number of braking hydraulic pressures when it is determined that the brake pressure of the vehicle is abnormal.

19. The method for brake inspection of vehicle of claim 18, further comprising:
after transmitting a control signal to the vehicle to generate a repeated number of braking hydraulic pressures, determining that the brake fluid piping is defective when the ESC pressure value is less than the set reference value and the ESC pressure value read repeatedly is not increased.

* * * * *